United States Patent
Kim et al.

(12)

(10) Patent No.: US 6,476,156 B1
(45) Date of Patent: Nov. 5, 2002

(54) BIODEGRADABLE TRIBLOCK COPOLYMERS AND PROCESS FOR THEIR PREPARATION

(75) Inventors: Young Ha Kim; Soo Hyun Kim; Ki Dong Park; Soo-Hong Lee, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/778,081

(22) Filed: Feb. 7, 2001

(30) Foreign Application Priority Data

Feb. 14, 2000 (KR) .......................................... 2000-6745

(51) Int. Cl.[7] .......................... C08G 63/08; C08G 65/08
(52) U.S. Cl. ........................ 525/403; 525/408; 525/411; 525/413; 528/301; 528/354
(58) Field of Search ................................ 525/403, 408, 525/411, 413; 528/301, 354

(56) References Cited

U.S. PATENT DOCUMENTS 5,434,241 A    7/1995   Kim et al. ................... 528/354
5,476,909 A *  12/1995  Kim et al. ................... 525/408

OTHER PUBLICATIONS

Siriporn Tanodekaew, et al., "Gelation of Aqueous Solutions of Diblock Copolymers of Ethylene Oxide and D,L–Lactide," Macromol. Chem. Phys. 198, 1997, pp. 3385–3395.*
Byeongmoon Jeong, et al., "Thermoreversible Gelation of Poly (Ethylene Oxide) Biodegradable Polyester Block Copolymer," Journal of Polyer Science: Part A: Polymer Chemistry, vol. 37, 1999, pp. 751–760.*

K. Jamshidi, et al., "Thermal Characterization of Polylactides," Polymer, vol. 29, Dec. 1988, pp. 2229–2234.*
Brian T. Butcher, Ph.D. "Isocyanate Induced Asthma". Eur. J. Respir Dis 63 (1982), suppl. 123, 78–81.
R. Timothy Mulgahy, et al. "Preliminary Evaluation of Isocyanate–Generating Nitroheterocycles as Chemosensitizers, Radiosensitizers and Hypoxic Cell Cytotoxic Agents", Int. J. Radiation Oncology Biol. Phys 10, 1609 (1984).
J. of the National Cancer Institute, "Relationship of Lung Adenoma Prevalence and Growth Hate to Acute Urethan Dose Target Cell Number ", 69, 4, 851 (1982).
Jian Ying Zhang, et al. "A New Peptide–Based Urethane Polymer: Synthesis Biodegradation, and Potential to Support Cell Growth in vitro", Biomaterials 21 (2000), 1247–1258.
J. of the National Cancer Institute, "Susceptibility of Various Strains of Mice to Urethane–Induced Lung Tumors and Depressed Natural Killer Cell Activity", 67, 6, 1317 (1981).

* cited by examiner

*Primary Examiner*—Ana Woodward
(74) *Attorney, Agent, or Firm*—Oblon, Spivak, McClelland, Maier & Neustadt, P.C.

(57) ABSTRACT

The present invention relates to polyethyleneglycol/polylactide(or polyglycolide or polycaprolactone)/polyethyleneglycol triblock copolymers with an enhanced reactivity, and process for their preparation. More specifically, the present invention is directed to triblock copolymers that are obtained by the process comprising the step of synthesizing a polylactide(or polyglycolide or polycaprolactone) having hydroxy groups at both ends and the step of coupling said polylactide with polyethyleneglycol having an acylhalide group of a high reactivity at one of its ends, and the process for preparing the same Since the triblock copolymer according to the present invention has an ester structure with good biocompatibility, it can be applied extensively for biomaterials used in tissue engineering, in a matrix that slowly releases drugs, etc.

10 Claims, No Drawings

BIODEGRADABLE TRIBLOCK COPOLYMERS AND PROCESS FOR THEIR PREPARATION

BACKGROUND OF THE INVENTION

1. Field of the Invention

The present invention relates to polyethyleneglycol/polylactide(or polyglycolide or polycaprolactone)/polyethyleneglycol triblock copolymers with an enhanced reactivity, and a process for their preparation.

Specifically, the present invention is directed to a triblock copolymers that are obtained by the process comprising the step to synthesize a polylactide(or polyglycolide or polycaprolactone) having hydroxy groups at both ends, and the step of coupling said polylactide with polyethyleneglycol having acylhalide group of a high reactivity at one of its ends, and the process for preparing the same.

2. Description of the Prior Art

Among the different applications of degradable polymer materials, it is most actively investigated in the field of medicine. A general medical polymer is used as a permanent material with replacement of parts for a living body, whereas a biodegradable polymer is used as a transient material to help healing of the body and disappears through the body's metabolism after completing its function. Due to these properties of the biodegradable polymer, an additional surgical operation to remove the polymer is not necessary after the body has healed. Also, as the body gradually heals, the polymer gradually degrades so that it can help newly developed tissue to function sufficiently.

Since the biodegradable polymer essentially has to have biocompatibility, only limited materials as polylactide, polyglycolide, polycaprolactone and polyethyleneglycol have been used to form the polymer. Many biodegradable polymers comprising polylactide and polyethyleneglycol have been studied in the form of block copolymers. Such polymers are comprised of hydrophobic polylactide and hydrophilic polyethyleneglycol and take the form of micelle in a solution. Also, since said polymers can make the hydrophobic polylactide hydrophilic, they can be applied widely as a bio-materials to be used as a matrix for the slow release of drugs, in tissue engineering, etc.

It was reported that block copolymer consisting of polylactide and polyethyleneglycol forms hydrogel in water and can be in a form of gel or sol by parameters of a temperature, pH, etc. so that it shows a behavior that can be used as slow releasing matrix of drug (Macromol. Chem. Phys. 198, 3385–3395 (1997)).

Most of such block copolymers, however, are in the form of a double block or triblock that is produced by a ring-open polymerization of lactide by polyethyleneglycol. Most triblocks are copolymers with a structural configuration of polylactide/polyethyleneglycol/polylactide, wherein hydrophilic polyethyleneglycol is present in the center and the hydrophobic polylactide is located at both ends.

In comparison to a block copolymer having the aforesaid configuration, a copolymer having a structural configuration of polyethyleneglycol/polylactide/polyethyleneglycol has the advantage to form harder micelle in a physical configuration when it is used as hydrogel. Furthermore, since hydrophilic polyethyleneglycol is present at both ends, its hydrophilizing effect is very great and it is expected to show a superior effect in the compatibility between hydrophobic material and hydrophilic material, and surface hydrophilization of hydrophobic material.

Because of these advantages, many efforts have been made to synthesize triblock copolymers to have a structural configuration of polyethyleneglycol/polylactide/polyethyleneglycol.

To synthesize the triblock copolymer, a method is used to couple the end groups of the synthesized polymer. In this case, the functional groups which are present at the ends of the polymer should have a very high reactivity so as to make the coupling reaction proceed quantitatively and, thus, to prepare block copolymers of the desired structure.

A generally used method is to couple the hydroxy group and the carboxyl group that are present at both ends of the polymer by use of a coupling agent such as diethyl azodicarboxylate (DEAD), triphenylphosphine (TPP), 1,3-dicyclohexylcarbodiimide (DCC) or 4-dimethylaminopyridine (DMAP). This method is generally used in coupling an organic compound. However, if it is used in the coupling reaction of the end groups in polymers, the reactivity is not high and, thus, the yield of block copolymer is very low and the catalysts used in the reaction are not easily removed.

Recently, a method is prevalently used to obtain a high reaction rate by use of a diisocyanate functional group having a high reactivity (J. Polym. Sci., Part A: Polym. Chem. 37, 751–760 (1999)). However, the block copolymer prepared by this method has the disadvantage that diusocyanate functional group with a strong toxicity remains in it.

Therefore, in preparing the block copolymer, it is very important to maintain the high reactivity of the functional groups and to connect the resulting copolymer only by non-toxic ester binding.

SUMMARY OF THE INVENTION

The present invention relates to polyethyleneglycol/polylactide(or polyglycolide or polycaprolactone)/polyethyleneglycol triblock copolymers with an enhanced reactivity, and the process for their preparation.

The present invention is specifically directed to triblock copolymers that are obtained by a process comprising the step of synthesizing a polylactide(or polyglycolide or polycaprolactone) having hydroxy groups at both ends and the step of coupling it with a polyethyleneglycol having an acylhalide group of a high reactivity at one of its ends, and a process for preparing the same.

DETAILED DESCRIPTION OF THE INVENTION

The present invention provides a non-toxic biodegradable triblock copolymer having an ester structure and a method for preparing the same with a high yield by using a starting material having functional groups of high reactivity.

The inventors have carried out a study to achieve the object and found that triblock copolymers having an ester structure can be prepared with high yield by coupling polyethyleneglycol, having an acylhalide group of a high reactivity at one of its ends, with polylactide (or polyglycolide or polycaprolactone), having a hydroxy group at both ends.

Therefore, the invention relates to a polyethyleneglycol/polylactide (or polyglycolide or polycaprolactone)/polyethyleneglycol copolymer with a structural configuration of hydrophilicity/hydrophobicity/hydrophilicity, and a method for preparing the same.

The copolymer according to the present invention can be prepared by coupling polyethyleneglycol having acylhalide of a high reactivity at one of its ends with polylactide (or polyglycolide or polycaprolactone) having a hydroxy group at both ends in the presence of pyridine.

Specifically, the present invention provides a biodegradable triblock copolymer selected from the group consisting of copolymer of formula (1) to (4) as follows:

| PEG-COO-PL-OCO-PEG | <formula 1> |
| PEG-COO-PG-OCO-PEG | <formula 2> |
| PEG-COO-(PL/PG)-OCO-PEG | <formula 3> |
| PEG-COO-PCL-OCO-PEG | <formula 4> |

In the formulas,
PEG is polyethyleneglycol,
PL is polylactide,
PG is polyglycolide,
PCL is polycaprolactone.

According to the present invention, polylactide having a hydroxy group at both ends is first synthesized by ring-open polymerization of lactide monomer in the presence of secondary alcohol. The ring-open polymerization is carried out under reduced pressure with heating by using a conventional catalyst such as stannous octotate. If α,ω-alkanediol such as ethylene glycol, 1,3-propanediol, 1,4-butanediol, and 1,6-hexanediol, which is a secondary alcohol, is used as a polymerization initiator, the resulting polylactide has hydroxyl groups at both ends (see scheme 1). At this time, the molecular weight of the polymer can be variously controlled depending on the added amount of the initiator and monomer. Polyglycolide and polycaprolactone can be prepared in the same manner as in the preparation of polylactide.

<Scheme 1>

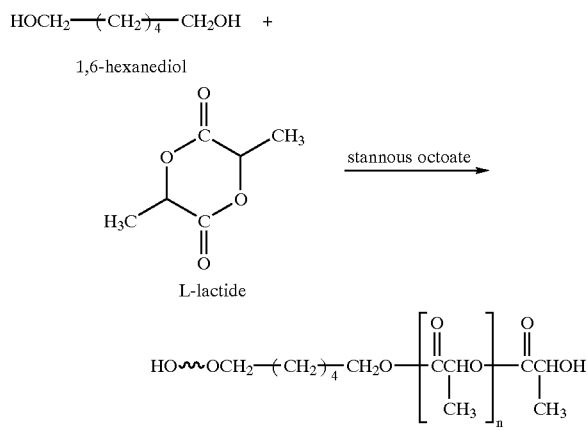

Polyethyleneglycol having acylhalide group at one of its ends can be synthesized in a two-step reaction. The first step is to substitute the carboxyl group for the hydroxyl group at one of its ends, and the second step is to replace the carboxyl group with the acylhalide group. First, the hydroxy group which is present at one of its ends of monomethoxypolyethyleneglycol (m-PEG) is reacted with succinic anhydride under 4-dimethyarminopyridine (DMAP) and triethylamine (TEA) as catalysts so that the carboxyl group is introduced at the end of m-PEG (see scheme 2). If a solvent used in the reaction is nonpolar one, such as methylene chloride and chloroform, there is almost no reaction; but if a high polar solvent such as 1,4-dioxane is used, the reaction takes place very well.

Monomethoxypolyethyleneglycol (mPEG-COOH) having a carboxyl group at one of its ends is reacted with thionyl chloride to convert the carboxyl group into an acylhalide group having a high reactivity. This reaction is carried out for 3 to 4 hours at 60° C. in methylene chloride solvent. Since the synthesized monomethoxypoly-ethyleneglycol (mPEG-COCl) having the acylhalide group at one of its ends has a high reactivity, it is very unstable. Thus, because it reacts with moisture in the air while in storage over a long period of time and is thus reconverted into m-PEG-COOH, it should be used in the coupling reaction immediately after its preparation.

<scheme 2>

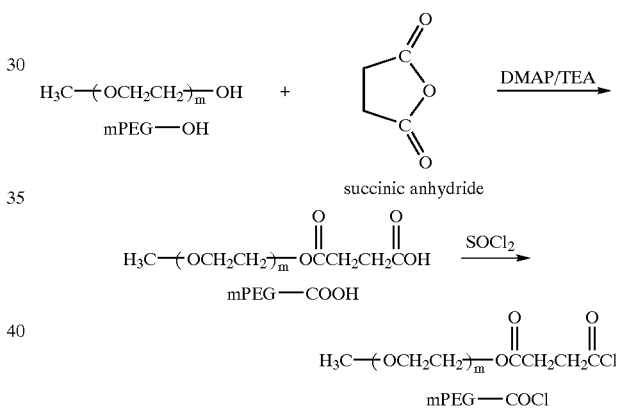

Polyethyleneglycol/polylactide/polyethyleneglycol copolymer is prepared by coupling monomethoxypolyethyleneglycol (mPEG-COCl) having the acylhalide group at one of its ends with polylactide (OH-PL-OH) having hydroxyl group at both ends as synthesized above (see scheme 3). Basic pyridine which functions as both a solvent and catalyst is used in the reaction. It removes HCl, which is produced in the reaction and plays a role in inducing the reaction toward the forward reaction. Furthermore, since addition of pyridine causes the exothermic reaction, it is gradually added with a small amount at 0°C.

<scheme 3>

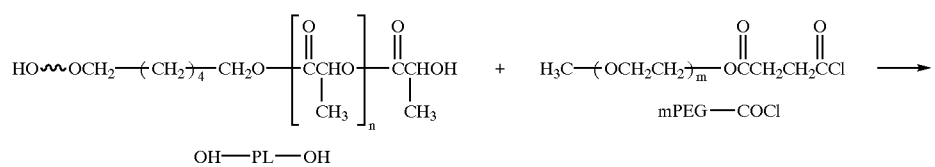

-continued

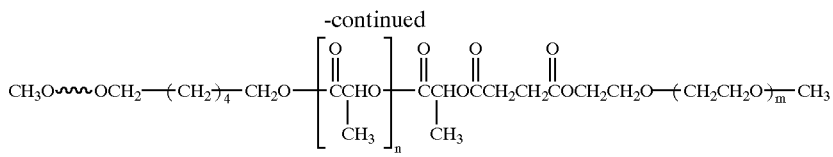

Thus prepared polyethyleneglycol/polylactide/polyethyleneglycol copolymer was obtained with a quantitative yield of more than 90%, and introduction of each functional group and coupling reaction of the end groups could be identified by means of FT-IR and $^1$H-NMR. Also, a high reaction rate of more than 90% was identified through an integral ratio of lactide monomer and ethyleneglycol monomer that are analyzed by $^1$H-NMR. In GPC (Gel Permeation Chromatography) molecular weight determination, the prepared triblock copolymer showed unimodal molecular weight distribution and had a higher molecular weight than each polylactide and polyethyleneglycol. From the results, it was found that the triblock copolymer of the complete structure was obtained.

As a result of Thermal Gravimetric Analysis (TGA), the prepared triblock copolymer showed a higher pyrolysis temperature than polylactide. Pyrolysis of polylactide has been reported to generally take place by means of an unzipping mechanism due to a hydroxy end group (Polymer, 2229–2234, 29, 1988), and pyrolysis of the triblock copolymer is presumably inhibited by replacement of hydroxy groups, which are present at both ends of polylactide, with polyethyleneglycol.

As a result of the analysis by a Differential Scanning Calorimeter (DSC), the prepared triblock copolymer had a lower crystallization temperature, a lower melting temperature and a smaller melting enthalphy than polylactide. This lowering phenomenon was enhanced proportionally to increase the molecular weight of the monomethoxypolyethyleneglycol that was added.

In determining the static contact angle which indicates hydrophilicity of the copolymer, introduction of polylactide sharply decreased the hydrophilicity of the copolymer, and as molecular weight of the polylactide become larger, the hydrophobicity of the copolymer increased.

Even in instances where polyglycolide or polycaprolactone is used in place of polylactide as a hydrophobic polymer, the triblock copolymer of a complete structure was obtained and it showed the similar thermal properties and hydrophilicity to the copolymer that was prepared by using polylactide.

DESCRIPTION OF THE PREFERRED EMBODIMENTS

The present invention is further described by the following examples but should not be construed as being limited by them.

EXAMPLE 1

L-lactide monomer 17.280 g (0.120 mol) was put in a 100 ml dried glass ampule, and stannous octotate 0.269 g (0.00066 mol) as a catalyst and 1,6-hexanediol 0.598 g (0.005 mol) as an initiator were added therein. A teflon-coated magnetic bar was introduced in the ampule. The ampule was maintained in a vacuum state at 0.01 mmHg for 20 min. to remove water, and then dry nitrogen was introduced. This procedure was repeated three times and the ampule was heat sealed under vacuum with a torch.

The sealed ampule was put in an oil bath of 130° C. and polymerization was carried out with stirring for 5 hours. As the polymerization proceeded, the viscosity of the polymerizaton system increased and stirring of the reactions could no longer be made. The polymerization system was initially in a clear gel state, but as the reaction proceeded, it became a white solid. After completing the reaction, the ampule was fully cooled by liquid nitrogen and then destroyed to collect the copolymer. The collected sample was dissolved in chloroform. Thereafter, it was precipitated in methanol to remove the catalyst, unreacted monomer and a low molecular weight of oligomer and dried under vacuum at ambient temperature for at least 12 hrs.

The obtained polymer had white color and the yield was in a quantitative value of above 99%. From $^1$H-NMR analysis, it was identified that the ring of lactide was opened by the initiator and the hydroxy groups were introduced at both ends. From the integral ratio of end groups and the monomer, the molecular weight of the polymer was identified to be about 4,700. Determined through the use of a Differential Scanning Calorimeter, the glass transition temperature and melting point of the polymer were 49.5° C. and 147.0° C., respectively.

By controlling the molar ratio of the initiator 1,6-hexanediol and the monomer lactide, polylactides (HO-PL-OH) having 500 to 30,000 of the molecular weight were prepared. Also, polylactides (HO-PL-OH) were prepared in the same manner by using 1,4-butanediol and 1,3-propanediol in place of 1,6-hexanediol.

EXAMPLE 2

150 ml of 1,4-dioxane was put in a 25 ml flask, and monomethoxy-polyethyleneglycol (mPEG-OH, molecular weight 750) having a hydroxy group at one of its ends 10.07 g (0.0134 mol) and succinic anhydride 2.0160 g (0.0201 mol) were added therein. Thereafter, DMAP 1.643 g (0.0134 mol) and TEA 1.356 g (0.0134 mol) were added as catalysts. The reaction was carried out at ambient temperature for 24 hours, and the reaction solution was then distilled under vacuum to remove the solvent. The resulting product was dissolved in $CCl_4$ and then filtered to remove unreacted succinic anhydride. The filtered solution was precipitated in cold ethylether solvent and then dried under vacuum at ambient temperature for more than 12 hours. From $^1$H-NMR analysis, it was identified that the ring of succinic anhydride was opened by the hydroxy group. Thus, the carboxyl group was introduced at the end of mPEG.

Using monomethoxypolyethyleneglycols with a molecular weight of 750 to 10,000, each product (mPEG-COOH) was synthesized in the same manner as above and purified.

EXAMPLE 3 mPEG-COOH 2.785 g (0.0037 mol), which was synthesized in Example 2, was put in 50 ml flask and completely dissolved in 50 ml of a purified methylene chloride. Thionyl chloride 0.88 g (0.0074 mol) and two drops of dimethylformamide as a catalyst were added to the solution. The reaction was carried out at 60° C. for about 3 hours, and the reaction solution was then distilled under vacuum to remove the solvent and unreacted thionyl chloride. From $^1$H-NMR analysis, it was identified that the acylhalide group was introduced at the end of MPEG and the product was used immediately in the coupling reaction.

Using monomethoxypolyethyleneglycols (mPEG-COOH) prepared in Example 2 with a molecular weight of 750 to 10,000, wherein carboxyl group was introduced at its end, each product (mPEG-COCl) was synthesized in the same manner as described above.

EXAMPLE 4

The mPEG-COCl having the molecular weight of 750, which was synthesized in Example 3, 2.70 g (0.0032 mol), and the polylactide (HO-PL-OH) having the molecular weight of 4,700, which was synthesized in Example 1, 3.67 g (0.00078 mol), were put in a 50 ml flask and the reaction was placed completely under nitrogen atmosphere. By using an ice bath of 0° C., the reaction system was maintained at a sufficiently low temperature and the purified pyridine 20 ml was then slowly added. Thereafter, the reaction system was maintained at ambient temperature, and the reaction was carried out for 24 hours. After the reaction solution was subject to precipitation in methanol, the solution was centrifuged. By repeating the procedure of the precipitation in methanol and centrifugation two or three times, an excess of monomethoxypolyethyleneglycol was completely removed. The thus-obtained sample was dried under vacuum at ambient temperature for at least 12 hours.

From $^1$H-NMR analysis, it was identified that the hydroxyl group and acylhalide group at the ends were quantitatively coupled. Furthermore, through GPC analysis, the prepared triblock copolymer had a larger molecular weight than each polylactide and polyethyleneglycol and showed unimodal molecular weight distribution, from which it was identified that the triblock copolymer of the complete structure was obtained.

Also, by using the materials obtained from Examples 1 and 3, respectively, each product was synthesized and purified in the same manner as described above. The formation of the triblock was then identified through the same analysis.

EXAMPLE 5

Polyglycolide (PG) was prepared by the same method as described in Example 1 except that the glycolide 13.920 g (0.120 mol) was used as the monomer and 1,4-butanediol was used as an initiator under the reaction temperature of 170° C. By controlling the molar ratio of the initiator 1,4-butanediol and the monomer glycolide, PGs having a molecular weight of 500 to 30,000 were prepared.

The prepared sample was coupled with the MPEG-COCl prepared in Example 3 in the same manner as described in Example 4, and a polyethyleneglycol/polyglycolide/polyethylene-glycol triblock copolymer was prepared.

EXAMPLE 6

A polylactide/polyglycolide (PL/PG) copolymer was prepared by the same method as described in Example 1 except that the lactide 12.096 g (0.084 mol) and glycolide 4.176 g (0.360 mol) were used as the monomers and the reaction temperature was 140° C. By controlling the molar ratio of the initiator 1,3-propanediol and the monomers lactide and glycolide, PL/PG copolymers were prepared with a molecular weight of 500 to 30,000.

The prepared sample was coupled with the mPEG-COCl prepared in Example 3 in the same manner as described in Example 4, and a polyethyleneglycol/polyglycolide-polylactide/polyethyleneglycol triblock copolymer was prepared.

EXAMPLE 7

Polycaprolactone (PCL) was prepared by the same method as Example 1 except that caprolactone 13.680 g (0.120 mol) was used as the monomer and the reaction temperature was 140° C. By controlling the molar ratio of the initiator 1,6-hexanediol and the monomer caprolactone, PCLs were prepared with a molecular weight of 500 to 30,000.

The prepared sample was coupled with the MPEG-COCl prepared in Example 3 in the same manner as described in Example 4 and polyethyleneglycol/poly-caprolactone/polyethyleneglycol triblock copolymer was prepared.

According to the present invention, polyethyleneglycol/polylactide (or polyglycolide or polycaprolactone)/polyethyleneglycol triblock copolymer can be obtained with a higher yield compared to the conventional coupling methods. Furthermore, the triblock copolymer according to the present invention is connected by ester coupling in its molecular chain so that it can disappear in a form nontoxic to the human body through the metabolism in vivo.

Since the present copolymer has hydrophilic groups at both ends, it can easily hydrophilize a biomaterial. Also, since the physical property and hydrophilicity of the copolymer can be controlled by controlling the molecular weight of polylactide (or polyglycolide or polycaprolactone) and polyethyleneglycol, it can be widely used as a biomaterial. In view of its structure, it can be utilized as a material capable of forming a hydrogel, especially as a drug-releasing material. Also, the copolymer is thermally stable so that the deterioration of its physical property that can be caused in heat treatment can be prohibited.

Such material of the invention can be applied extensively as a bio-absorbable material, a material for tissue engineering, agricultural chemicals or medicine, a matrix that slowly releases drugs, etc.

What is claimed is:

1. A biodegradable triblock copolymer selected form the group consisting of copolymers of formulae (1) to (4):

| | |
|---|---|
| PEG-COO-PL-OCO-PEG | formula 1, |
| PEG-COO-PG-OCO-PEG | formula 2, |
| PEG-COO-(PL/PG)-OCO-PEG | formula 3, |
| PEG-COO-PCL-OCO-PEG | formula 4; | wherein
PEG is polyethyleneglycol;
PL is polylactide;
PG is polyglycolide; and
PCL is polycaprolactone.

2. The biodegradable triblock copolymer according to claim 1, wherein the molecular weight of PEG is 750 to 10,000.

3. The biodegradable triblock copolymer according to claim 1, wherein the molecular weight of polylactide, polyglycolide, polylactide/polyglycolide or polycaprolactone is 500 to 30,000.

4. A method for preparing a triblock copolymer which comprises coupling polyethyleneglycol having an acylhalide group of a high reactivity at one of its ends with polylactide, polyglycolide, polylactide/polyglycolide or polycaprolactone having a hydroxy group at both of its ends in the presence of pyridine.

5. The method according to claim 4, wherein said pyridine is added at a temperature of 0° C.

6. The method according to claim 4, wherein said polylactide having a hydroxy group at both ends is synthesized by ring-opening polymerization of a lactide monomer in the presence of a secondary alcohol.

7. The method according to claim 6, wherein said ring opening polymerization is catalyzed by stannous octoate.

8. The method according to claim 6, wherein said secondary alcohol is an α,ω-alkanediol selected from the group consisting of ethylene glycol, 1,3-propanediol, 1,4-butanediol and 1,6 hexanediol.

9. The method according to claim 4, wherein said polyethyleneglycol having an acylhalide group at one of its ends is synthesized by reacting monomethoxypolyethyleneglycol with succinic anhydride in the presence of 4-dimethylaminopyridine and triethylamine, thereby introducing a carboxyl group at one of the ends of the monomethoxypolyethyleneglycol; and reacting said monomethoxypolyethyleneglycol having a carboxyl group at one of its ends with thionyl chloride, thereby converting said carboxyl group into an acylhalide group.

10. The method according to claim 4, wherein a yield of said triblock copolymer is more than 90%.

* * * * *